United States Patent
Ogawa

(10) Patent No.: US 7,154,833 B2
(45) Date of Patent: Dec. 26, 2006

(54) LASER POWER SELECTING METHOD, INFORMATION RECORDING MEDIUM, AND INFORMATION RECORDING DEVICE

(75) Inventor: Masatsugu Ogawa, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 10/528,507

(22) PCT Filed: Sep. 19, 2003

(86) PCT No.: PCT/JP03/11992

§ 371 (c)(1),
(2), (4) Date: Mar. 18, 2005

(87) PCT Pub. No.: WO2004/027764

PCT Pub. Date: Apr. 1, 2004

(65) Prior Publication Data

US 2006/0072410 A1 Apr. 6, 2006

(30) Foreign Application Priority Data

Sep. 20, 2002 (JP) .............................. 2002-275375

(51) Int. Cl.
*G11B 7/00* (2006.01)
(52) U.S. Cl. .................. 369/53.34; 369/59.24; 369/47.53; 369/124.15
(58) Field of Classification Search .................. None
See application file for complete search history.

(56) References Cited

U.S. PATENT DOCUMENTS

2002/0105874 A1* 8/2002 Matsumoto ............... 369/47.53
2003/0007435 A1* 1/2003 Fukumoto ................. 369/47.53

FOREIGN PATENT DOCUMENTS

| JP | 10-124876 | 5/1998 |
| JP | 10-124950 | 5/1998 |
| JP | 10-283656 | 10/1998 |
| JP | 2001-283436 | 10/2001 |
| JP | 2002-260230 | 9/2002 |

OTHER PUBLICATIONS

International Search Report for PCT/JP2003/011992 dated Dec. 11, 2003.
Internatinal Preliminary Examination Report mailed by PCT on Jun. 23, 2005 in connection with corresponding PCT application PCT/JP2003/011992.

* cited by examiner

*Primary Examiner*—Wayne Young
*Assistant Examiner*—Minerva Rivero
(74) *Attorney, Agent, or Firm*—Ostrolenk, Faber, Gerb & Soffen, LLP

(57) ABSTRACT

A laser power selecting method includes the steps of recording an asymmetry measuring recording pattern in an optical disk trial-writing area while a laser power is being changed, reproducing a signal from the trial-writing area to calculate an asymmetry value from the waveform of the reproduced signal, determining the change rate of asymmetry from the relation between a laser power when the recording pattern is recorded and the calculated asymmetry value, and setting a laser power, at which the determined change rate of an asymmetry value is maximum, as a recording power used when recording on an optical disk.

19 Claims, 5 Drawing Sheets

-- Prior Art --

-- Prior Art --

| Space information code | Space (T) |
|---|---|
| 0001b | 1 |
| 0010b | 1.2 |
| 0011b | 1.4 |
| 0100b | 1.6 |
| 0101b | 1.8 |
| 0110b | 2 |
| 0111b | 2.2 |
| 1000b | 2.4 |
| 1001b | 2.6 |
| 1010b | 2.8 |

| Compatibility information code | Applicability |
|---|---|
| 0001b | applicable |
| 0010b | not applicable |

LASER POWER SELECTING METHOD, INFORMATION RECORDING MEDIUM, AND INFORMATION RECORDING DEVICE

CROSS REFERENCE TO RELATED APPLICATION

The present application is a 35 U.S.C. § 371 national phase conversion of PCT/JP2003/011992 filed 19 Sep. 2003, which claims priority of Japanese Application No. 2002-275375 filed on 20 Sep. 2002.

The PCT International Application was published in the Japanese language.

TECHNICAL FIELD

The present invention relates to a laser power selecting method, information recording medium and information recording device, and more particularly, to a laser power selecting method capable of simply selecting such a recording power that allows an excellent reproduced signal to be obtained from a recorded signal, as well as an information recording device and an information recording medium used therein.

BACKGROUND ART

At present, developments have been being made in recordable optical disks having a high density, such as a DVD-R, DVD-RW, and DVD+RW, which have already been put into markets. As is well known, quality of recorded signals deteriorates unless the power of a laser beam (recording power) is at a proper value when those recordable optical disks are irradiated with a laser beam to perform recording. For an optical disk drive which records data on an optical disk, control of laser power used for recording becomes one of more essential techniques, along with the increasing density of the optical disk as a recording target.

In an optical disk drive, the laser power of the beam irradiated from an optical head varies due to a variety of factors. For example, even if the recording power is set to a proper value at the time of factory delivery, the power of the laser beam irradiated on an optical disk often takes an improper value when recording is actually carried out. Hence, an optical disk drive sets the recording power to a proper value via OPC control (Optimum Power Control) prior to recording, to improve recording quality.

In the OPC control, trial-writing is conducted by recording a signal having a predetermined pattern on a predetermined area of an optical disk while varying the laser power. Recording power is set on the basis of information obtained by reproducing the trial-writing signal. Known methods for the OPC control are a β method which uses a β value correlated with the asymmetry value of the reproduced signal, and a γ method which uses a γ value correlated with the signal amplitude of the reproduced signal. The recording power is set by use of either one of these methods. For example, Japanese Patent Application Laid-Open Publication Nos. 2001-283436 and 10-283656 describe methods in which an asymmetry value is obtained by use of the β method to set the recording power.

In general, the β method in which the asymmetry value is monitored based on the relationship between a long mark and a short mark is highly reliable in comparison with the γ method in which only the signal amplitude is monitored. When performing the OPC control for a phase-change DVD-RW or DVD+RW, however, the asymmetry value does not depend on the laser power in some media. That is, there is a case that the asymmetry value does not linearly change in relation to the laser power. In this case, the recording power cannot be set by use of the β method and thus the γ method is adopted.

Meanwhile, a phase-change optical disk has been known as causing a phenomenon (cross-erase) that a mark once recorded on a track adjacent to the track for recording thereon (recording track) disappears. This cross-erase tends to occur more frequently as the laser power increases. The present inventor has found a problem that if the recording power is set according to the γ method, cross-erase occurs in adjacent tracks although writing on a recording track may be achieved excellently. That is, selection of a recording power according to the γ method cannot optimize the recording power where consideration is taken into cross-erase in adjacent tracks.

When recording is performed on a phase-change optical disk, the recording power should desirably be determined in consideration of cross-erase. However, if recording is performed on both of a recording track and adjacent tracks and if a recording power is determined by inspecting influences of cross-erase, a drawback arises in that a longer time is required to select the recording power. No known conventional method has been capable of performing excellent writing on a recording track when performing recording on a phase-change optical disk together with capable of setting rapidly a recording power less influenced by cross-erase.

DISCLOSURE OF THE INVENTION

It is an object of the present invention to provide a laser power selecting method capable of determining a recording power so that even a phase-change optical disk has less influence on cross-erase and achieves excellent recording and capable of rapidly selecting the recording power without increasing the time length, and to provide an information recording device and an information recording medium used therein.

The present invention provides, in a first aspect thereof, a laser power selecting method for selecting a laser power to record modulated codes on an information recording medium by use of a laser beam, characterized by comprising the steps of: recording a predetermined signal pattern on the information recording medium; reproducing the predetermined signal pattern recorded, and calculating an asymmetry value from the predetermined signal pattern reproduced; obtaining a change rate of the asymmetry value relative to a laser power; and selecting a laser power at which the change rate assumes a maximum value.

In accordance with the laser power selecting method of the first aspect of the present invention, the predetermined signal pattern is recorded on the information recording medium while changing the laser power, and the recorded pattern is read out to calculate the asymmetry for each of the laser powers. The change rate of the laser power is obtained based on the calculated asymmetry, and the laser power at which the change rate (differential) assumes a maximum is selected as a recording power used when recording data on the information recording medium. The present inventor obtained a knowledge that, selection of a laser power, at which the change rate of the asymmetry assumes a maximum, as the recording power for a phase-change disk allows the reproduced signal to have excellent jitter characteristic even in the case where cross-erase occurs on the adjacent tracks, without the need for actually recording on the successive tracks to investigate the influence of the cross-erase.

The maximum rate of the change rate may be obtained by approximating the graph of the change rate of the asymmetry as to the laser power and finding from the maximum value (maximal value) of the approximated curve.

The present invention provides, in a second aspect thereof, a laser power selecting method for selecting a laser power to record modulated codes on an information recording medium by use of a laser beam, the method including recording a predetermined signal pattern on an information recording medium, and reproducing the predetermined signal pattern recorded, and selecting a laser power on the basis of the predetermined signal pattern reproduced, wherein: the predetermined signal pattern is a combination pattern which combines sequentially a first signal having at least one mark and at least one space which are respectively longer in length than the shortest mark and shortest space among modulated codes to be recorded, and a second signal having a plurality of marks equal in length to the shortest mark among the modulated codes to be recorded and a plurality of spaces shorter in length than the shortest space among the modulated codes to be recorded.

In accordance with the laser power selecting method of the second aspect of the present invention, the predetermined signal pattern is recorded on the information recording medium while changing the laser power, and the recorded signal pattern is read out to select the recording power used for recording data on the information recording medium. As the predetermined signal pattern, a combination pattern is adopted which sequentially combines the first pattern of a longer period including marks of the same length and spaces of the same length, and the second pattern of a shorter period including short marks and shorter spaces of a shorter length which are shorter than the shortest space among the modulated codes. For example, when recording the predetermined signal pattern on a phase-change optical disk, if a higher laser power is adopted, the marks of the second signal having the small length are erased by subsequent short marks which are recorded subsequent to the marks, with a space of the second signal shorter than the shortest space being disposed therebetween. That is, a cross-erase along a tangential direction (track direction) occurs. The present inventor obtained a knowledge that the cross-erase, which is considered to occur in the radial direction (direction toward the adjacent tracks), can be estimated based on the degree of the occurring of the cross-erase along the tangential direction. The recording power can be selected as a laser power at which a cross-erase does not occur (has a less probability of occurring) in the tangential direction based on the reproduced signal from the predetermined signal pattern.

The present invention provides, in a third aspect thereof, an information recording device which records modulated codes on an information recording medium by use of a laser beam, characterized by: recording means for recording a predetermined signal pattern on the information recording medium; reproducing means for reproducing the predetermined signal pattern recorded by the recording means; signal processing means for calculating an asymmetry value from the predetermined signal pattern reproduced by the reproducing means, and obtaining a change rate of the asymmetry value relative to a laser power; and laser power adjusting means for selecting a laser power at which the change rate assumes a maximum value.

In accordance with the third aspect of the present invention, the recording means records the predetermined signal pattern on the information recording medium which changing the laser power for a plurality of times, and the reproducing means reads out the predetermined signal pattern recorded on the information recording medium. The signal processing means calculates an asymmetry value for each of the laser powers from the reproduced signal, and obtains the change rate of the calculated asymmetry with respect to the laser power, The laser power adjusting means selects the laser power, at the change rate assumes a maximum, as a recording power. When the information recording device records on the information recording medium by using the recording power thus selected, excellent recording can be performed to obtain excellent jitter characteristic of the reproduced signal from the recorded signal even in the case where a cross-erase occurs between the adjacent tracks. It is to be noted that the information recording devices of the present invention include a recording dedicated device and a recording/reproducing device.

The present invention provides, in a fourth aspect thereof, an information recording device which records modulated codes on an information recording medium by use of a laser beam, characterized by comprising: recording means for recording a combination signal pattern on an information recording medium, the signal pattern combines sequentially a first signal having at least one mark and at least one space which are respectively longer in length than shortest mark and shortest space among modulated codes to be recorded, and a second signal having a plurality of marks equal in length to the shortest mark among the modulated codes to be recorded and a plurality of spaces shorter in length than the shortest space among the modulated codes to be recorded; reproducing means for reproducing the combination signal pattern recorded by the recording means; and laser power adjusting means for selecting a laser power on the basis of the combination signal pattern reproduced by the reproducing means.

In accordance with the fourth aspect of the present invention, the recording means records the combination signal pattern which combines sequentially a first signal having at least one mark and at least one space which are respectively longer in length than shortest mark and shortest space among modulated codes to be recorded, and a second signal having a plurality of marks equal in length to the shortest mark among the modulated codes to be recorded and a plurality of spaces shorter in length than the shortest space among the modulated codes to be recorded, while changing the laser power for a plurality of times. The reproducing means reads out the combination signal pattern recorded on the information recording medium. Along with recording the combination pattern while increasing the laser power, a cross-erase occurs in the tangential direction at and above one of the laser powers adopted. The laser power adjusting means obtains a laser power having a less probability in occurring of the cross-erase along the radial direction based on the correlation between the cross-erase along the tangential direction and the cross-erase along the radial direction, thereby selecting the laser power as the recording power. Thus, the information recording device can perform excellent recording even in the condition where a cross-erase occurs between adjacent tracks.

In the information recording device of the present invention, it is preferable that the laser power adjusting means calculate an asymmetry based on the reproduced signal to select the laser power based on the asymmetry. Since the degree of the occurrence of the cross-erase along the tangential direction can be detected from the asymmetry value, the laser power adjusting means can select the recording power based on the asymmetry.

In the information recording device of the present invention, the laser power adjusting means obtains the change rate of the asymmetry with respect to the laser power based on the calculated asymmetry, to select the laser power at which the change rate assumes a maximum. Since the recording is superior at the laser power at which the change rate of the asymmetry with respect to the laser power assumes a maximum, the laser power adjusting means preferably selects the laser power as the recording power.

In the laser power selecting method and the information recording device of the present invention, each of the mark length and the space length of the modulated signal to be recorded may be nT (n is 3, 4, 5, 6, 7, 8, 9, 10, 11, or 11, whereas T is the channel clock period). In this case, the modulated codes may be EFMplus-modulated codes.

In the laser power selecting method and the information recording device of the present invention, the fist signal may preferably include a mark length and a space length of 10T, 11T or 14T. Since the first signal portion of the predetermined signal is used as a reference, the signal should preferably has a longer period.

In the laser power selecting method and the information recording device of the present invention, the second signal preferably has a 3T mark length and a 2T space length. In the EFMplus-modulated codes, the space having a smaller length than the shortest space of the second signal portion of the predetermined signal pattern may be a space shorter than the 3T space. The present inventor confirmed that a 2T space shorter than the 3T space improved the accuracy in selection of the recording power.

In the laser power selecting method of the present invention, the laser power selecting step preferably calculates the asymmetry from the predetermined signal pattern reproduced to select the laser power based on the asymmetry. When a cross-erase occurs in the tangential direction at a laser power, the asymmetry has a lower change late at laser powers exceeding this laser power, to assume a substantially constant value. Thus, the degree of the occurring of the cross-erase along the tangential direction can be estimated based on the asymmetry, whereby a recording power achieving a reproduced signal having excellent jitter characteristic can be selected based on the asymmetry even on the condition of occurring of the cross-erase.

In the laser power selecting method of the present invention, the laser power selecting step may obtain the change rate of the asymmetry with respect to the laser power and select the laser power at which the change rate assumes a maximum. Even in the case of selecting the recording power in this manner, the jitter characteristic of the reproduced signal is superior even on the condition of occurring of the cross-erase between adjacent tracks.

The information recording medium of the present invention is directed to an information recording medium on which the laser power selecting method of the second aspect is used for recording, wherein information as to a space length shorter than the shortest space length is recorded.

In accordance with the information recording medium of the present invention, information is recorded which defines a space length shorter than the shortest space length of the second signal of the predetermined signal pattern used in the laser power selecting method of the second aspect. This allows a space length shorter than the shortest space to be set for each medium.

The information recording medium of the present invention is directed to an information recording medium on which the laser power selecting method is used for recording, wherein information as to whether or not the above method is applicable is further recorded.

In a current information recording medium, an excellent recording can be obtained by using the laser power selecting method as described above. However, if another medium having different characteristics is developed in the future, the above method is not necessarily to be adopted thereon. For coping with this situation, the medium preferably records thereon information as to whether or not the above method is applicable.

The information recording device of the present invention is directed to an information recording device for recording modulated codes on the information recording medium on which information as to the space length is recorded, the information recording device including an information reproducing means for reading out the information as to the space length shorter than the shortest space length, and a laser power adjusting means for selecting a laser power based on the information thus read.

In accordance with the information recording device of the present invention, the information reproducing means reads out the information as to the space shorter than the shortest space of the second signal of the combination signal, to determine the short space length of the second signal based on the information read out. Thus, the short space length of the second signal is set to select the recording power.

In the information recording device of the present invention, a configuration is employed wherein the information reproducing means reads out the information as to whether or not the laser power selecting method is applicable, upon recording on the information recording medium on which the information as to whether or not the method is applicable is recorded, whereby the laser power adjusting means determines whether or not the laser power selecting method of the present invention is adopted. For example, information of "not applicable is recorded in a new information recording device in which the means are not adapted to selection of the recording power, whereby the new information recording medium may be used together with the information recording medium including the above means for selecting the recording power.

In the information recording device of the present invention, a memory device may be provided therein for storing information as to the space shorter than the shortest space length.

BEST MODE FOR CARRYING OUT THE INVENTION

Figure 1:
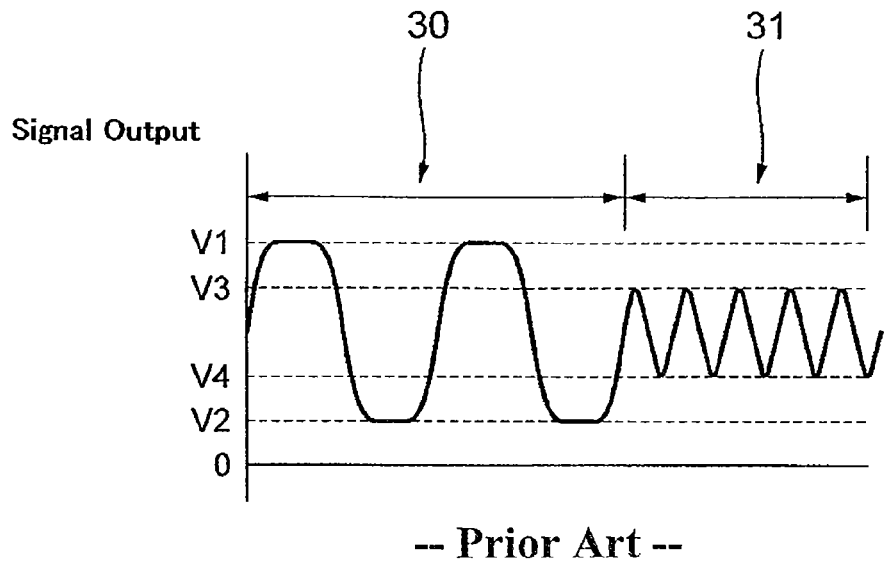
FIG. 1 is a waveform graph showing an example of an asymmetry measuring recording pattern generally used.

Knowledge which the present inventor has reached will now be described before making a detailed description of the present invention. FIG. 1 shows an example of an asymmetry measuring recording pattern. For example, an asymmetry measuring recording pattern is created with use of EFMplus-modulated codes which are ordinarily used for DVDs. The recording pattern shown in the figure is the same as the recording pattern used to determine a recording power according to the conventional β method.

In general, EFMplus-modulated codes are comprised of marks and spaces each having a length of nT (n is 3, 4, 5, 6, 7, 8, 9, 10, 11, or 14) where T is a channel clock cycle. In the example shown in FIG. 1, the recording pattern consists of exclusive signals 30 which include long marks and spaces each having a length of 11T, and exclusive signals 31 which include short marks and spaces each having a length of 3T.

Figure 2:
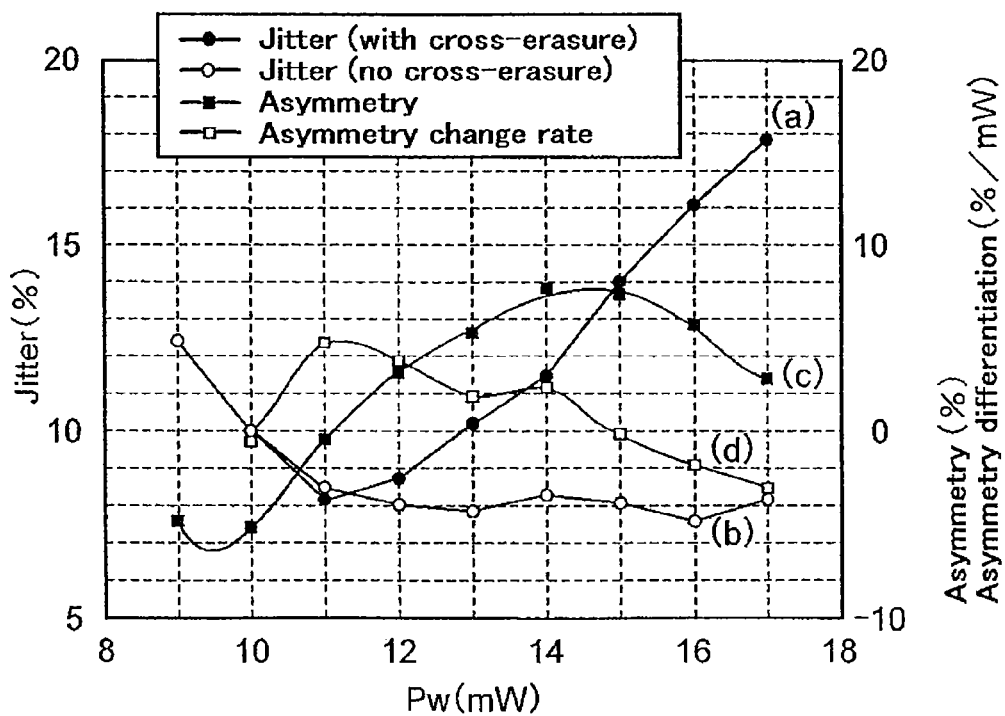
FIG. 2 is a graph showing characteristics of a reproduced signal from a recording medium which has recorded the pattern shown in FIG. 1.

FIG. 2 shows measurement results as to characteristics of reproduced signals from a recording medium which has recorded thereon the pattern shown in FIG. 1. In the graph, the horizontal axis represents the laser power. In this experiment, the recording pattern shown in FIG. 1 was recorded on a recording track of a recording medium (DVD-RW) and was reproduced therefrom. Recording was carried out supposing two cases. In one case (curve (a)), recording was performed both on a recording track and on tracks adjacent to the recording track. In another case (curve (b)), recording was performed only on a recording track and not on adjacent tracks. Recorded signals were reproduced in both cases, and jitters of the reproduced signals were measured. Further from the reproduced signal in the case of recording under conditions of the curve (b), an asymmetry value (curve (c)) and a change rate (curve (d)) as to the laser power of the asymmetry value were calculated. Along the vertical axis in FIG. 2, the left gauge indicates jitter (%). The right gauge indicates asymmetry (%) and an asymmetry change rate (%/mW).

As shown in FIG. 2 (curves (a) and (b)), the recording quality improves and jitters of the reproduced signals decrease, as the laser power increases from 9 mW. However, as the laser power exceeds 11 mW, the jitter of a reproduced signal increases and the recording quality degrades. This is because cross-erase occurs erasing marks in adjacent tracks and influence thereof enhances as the laser power increases, as indicated by the curve (a). In case of the curve (b), recording is not performed on adjacent tracks, and therefore, cross-erase is not caused between adjacent tracks even when the laser power is increased. As a result, the jitter of the reproduced signal does not significantly change.

Meanwhile, an asymmetry value was calculated from an average signal level of the reproduced signal. The asymmetry value A when the recording pattern shown in FIG. 1 is reproduced can be defined by the following expression. In this expression, V1 is the maximum amplitude of exclusive 11T signals, V2 is the minimum amplitude of the exclusive 11T signals, V3 is the maximum amplitude of exclusive 3T signals, and V4 is the minimum amplitude of the exclusive 3T signals.

$$A = \frac{(V1 + V2) - (V3 + V4)}{2 \cdot (V1 - V2)}$$

The asymmetry change rate is defined as follows. That is, where the laser power is increased gradually, a difference between an asymmetry value at a particular laser power and another asymmetry value at a previous laser power preceding by one level the particular laser power is divided by a difference between both laser powers.

It will be apparent from FIG. 2 that the change rate of the asymmetry value is maximized at a laser power which minimizes jitters of the reproduced signal indicated by curves (a) and (b), or in other words, with a laser power immediately before cross-erase occurs and increases the jitter of the reproduced signal indicated by the curve (a). Therefore, it is possible to obtain a laser power which results in excellent formation of recorded signals on an optical disk by obtaining a change rate of the asymmetry value for every change of the laser power and by searching for the maximum value of the change rate of the asymmetry value. The present inventor has hence accomplished the present invention based on the knowledge as described above.

Figure 3:
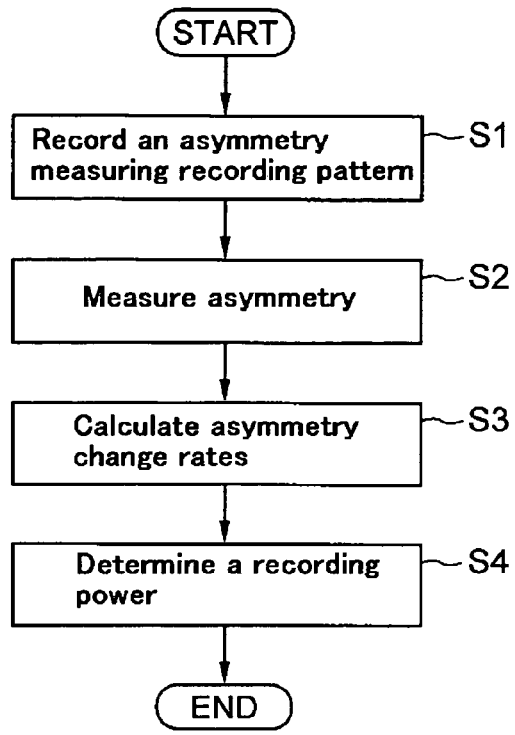
FIG. 3 is a flowchart showing a schematic flow of a processing in a laser power selecting method according to a first embodiment of the present invention.

Hereinafter, the present invention will be described in more details on the basis of preferred embodiments of the invention with reference to the drawings. FIG. 3 schematically shows a processing for selecting a laser power according to a first embodiment of the present invention. In an optical disk drive which records signals on an information recording medium (optical disk), a recording power is selected in the following procedure prior to recording of signals.

At first, an asymmetry measuring recording pattern is recorded on a trial-writing area of an optical disk while changing the laser power (step S1). After the measurement recording pattern is recorded, the signal is reproduced from the trial-writing area. From the waveform of the reproduced signal, an asymmetry value is calculated (step S2). Next, an asymmetry change rate is obtained from the relationship between the laser power when the recording pattern was recorded and the calculated asymmetry value (step S3). The change rate of the asymmetry value is defined by ΔA/ΔP where ΔP is a change amount of the laser power and ΔA is a change amount of the asymmetry value. A laser power at which the obtained change rate of the asymmetry value assumes a maximum value is selected as the recording power used for recording on the optical disk (step S4). Recording is performed on the optical disk with the selected recording power. Thus, recorded signals are so excellently formed on the optical disk that reproduced signals having improved quality are obtained at the time of reproduction from the optical disk.

Figure 4:
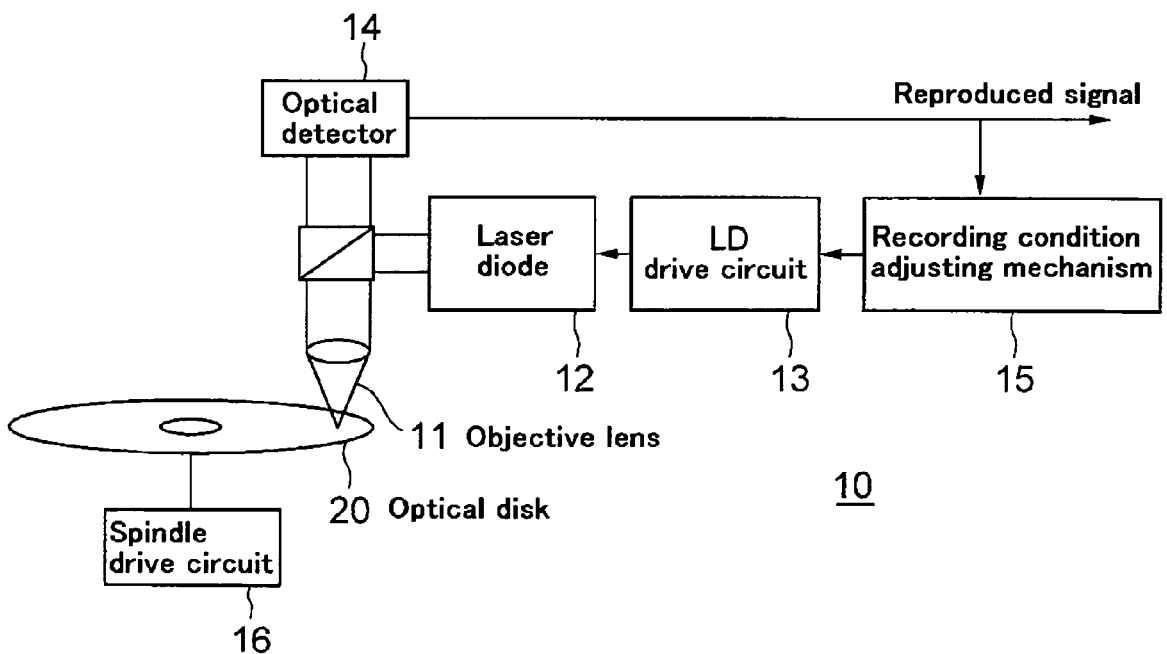
FIG. 4 is a block diagram showing an optical disk drive which adopts the laser power selecting method according to the first embodiment of the present invention.

FIG. 4 shows a structure of an optical disk drive which adopts the laser-power selecting method according to the first embodiment described above. The optical disk drive (information recording/reproducing device) 10 has an objective lens 11, laser diode (LD) 12, LD drive circuit 13, optical detector 14, recording-condition adjusting mechanism 15, and spindle drive circuit 16.

The LD drive circuit 13 controls the output from the LD 12. The objective lens 11 allows the laser beam, which is output from the LD 12, to be irradiated on the recording surface of an optical disk 20 to read/write information from/into the optical disk 20. The objective lens 11 receives, as incident light, reflected light of the laser beam irradiated through the objective lens 11 itself and inputs the incident light into the optical detector 14. The spindle drive circuit 16 rotates the optical disk 20. The optical detector 14 reproduces data recorded on the optical disk 20, based on the reflected light from the optical disk 20. The recording-condition adjusting mechanism 15 determines the recording power as an output from the LD 12 when recording is performed on the optical disk 20, based on a reproduced signal reproduced by the optical detector 14.

When a recording power needs to be determined, the recording-condition adjusting means 5 determines a recording power based on the procedure shown in FIG. 3 and then sets the recording power in the LD drive circuit 13. More specifically, the recording-condition adjusting mechanism 15 records several recording patterns each consisting of, for example, the recording pattern shown in FIG. 1, on a predetermined area of the optical disk 20 while changing the output of the LD 12 by controlling the LD drive circuit 13. The optical detector 14 reproduces the recording patterns from the predetermined area of the optical disk 20 and inputs reproduced signals to the recording-condition adjusting mechanism 15. The recording-condition adjusting mechanism 15 calculates asymmetry values from the reproduced signals, and obtains change rates of the asymmetry values at respective changed levels of the laser power. A recording power is determined based on the relationship in size between the obtained change rates.

In the present embodiment, based on the knowledge as described above, asymmetry values are calculated from a reproduced signal of a pattern recorded with the laser power being changed, and change rates of the asymmetry values in relation to laser powers are obtained. The maximum value of the obtained change rates is searched for, and a laser power at which the change rate is maximized is selected as the recording power. Even if recording is performed under conditions as described previously that cause cross-erase when the change rate of the asymmetry value is maximized, the jitter of the reproduced signal is minimized. Therefore, the optical disk drive 10 is capable of performing excellent recording on the optical disk 20 by setting the output of the LD 12 at the selected recording power.

In conventional techniques, in order to obtain a laser power which minimizes jitter of a reproduced signal under conditions that cause cross-erase, recording has to be performed actually on both a recording track and adjacent tracks. It is then necessary to evaluate what influence a signal on the recording track receives from recording on adjacent tracks. In this case, the optical disk drive has to perform recording on at least three tracks. In the present embodiment, it is possible to obtain a laser power which minimizes the jitter of a reproduced signal under conditions that cause cross-erase, without performing actual recording on adjacent tracks, as described above. In other words, the laser power which minimizes the jitter of a reproduced signal can be obtained when only recording is performed merely on a part of a track. Accordingly, a laser power which ensures excellent recording quality can be selected simply at a high speed when recording is performed on an optical disk.

In addition, in case of a conventional phase-change optical disk like a DVD-RW, the asymmetry value is not proportional to the laser power. Therefore, the $\gamma$ method is used to select the laser power in many cases. The $\gamma$ method works, however, to monitor only the signal amplitude of a recorded signal and results in a problem of low reliability as to the recording power supplied based on the $\gamma$ method. In the present embodiment, the change rate of the asymmetry value is used to select a recording power. Therefore, with respect to a phase-change optical disk, the recording power can be selected on the basis of asymmetry values, with a result that the reliability as to the selected recording power improves.

EXAMPLE 1

An optical disk drive 10 shown in FIG. 4 was manufactured as a test product, and a laser power was selected in the procedure as described above. Recording was then performed on an optical disk (DVD-RW) 20. The optical disk drive 10 as a test product used an optical head having a laser wavelength of 650 nm, numerical aperture (NA) of 0.6, and true-circle beam diameter of 0.9 µm. The channel clock at a normal speed (1×) was 26.16 MHz, and the spindle drive circuit 16 rotated the optical disk 20 at a linear speed of 3.49 m/s at the normal speed. Using the optical disk drive 10 as a test product, the pattern as shown in FIG. 1 was subjected to batch-recording on a PCA (Power Calibration Area) provided in the DVD-RW for laser power adjustment while changing the laser power for every one sync-frame. Next, the pattern recorded on the PCA area was subjected to batch-reproduction, and asymmetry values at respective laser powers were calculated.

From the relationship between the calculated asymmetry values and the laser powers, change rates of the asymmetry values were obtained, and a laser power which maximizes the change rate is searched for. The laser power was selected as a recording power. The selected laser power was 11.8 mW. As a comparative example, recording was performed also on adjacent tracks, and an actual optimum recording power was checked. The recording power thus checked was 11 mW. In this manner, the recording power obtained in the method according to the above embodiment was proved to be substantially equal to the actual optimum recording power.

The time length required for selecting the recording power from the recording on the PCA area was equivalent to about two turns of the disk (around several milliseconds). It was hence proved that this selection of the recording power was achieved at a higher speed, compared with other selection of a recording power by performing sequential recording on tracks. With the recording power thus selected, writing was carried out sequentially on a plurality of tracks on the DVD-RW, i.e., writing was carried out under conditions that cause cross-erase. Signals recorded on the DVD-RW were reproduced, and jitters of the reproduced signals were measured. The measured jitters were about 9% which is an excellent value.

In another comparative example, recording power was selected with respect to a DVD-RW, based on a conventional method using the $\gamma$ method. Firstly in the $\gamma$ method, the signal amplitude of a reproduced signal (modulation) is differentiated with respect to a laser power to obtain a standardized $\gamma$ value, as described in "DVD book" or the like. Next, a laser power at which the standardized $\gamma$ value becomes 1.5 is obtained. The obtained laser power is multiplied by 1.22, and the multiplied laser power is used as a recording power. With use of the same DVD-RW as described above, a laser power was selected based on the $\gamma$ method, and sequential recording was performed. Jitters of recorded signals were measured to be about 12%. Characteristics were thus inferior to those of the recording which used a recording power selected by the method according to the embodiment described above. It was hence proved that the method according to the above embodiment is superior to the conventional recording power selecting method.

Figure 5:
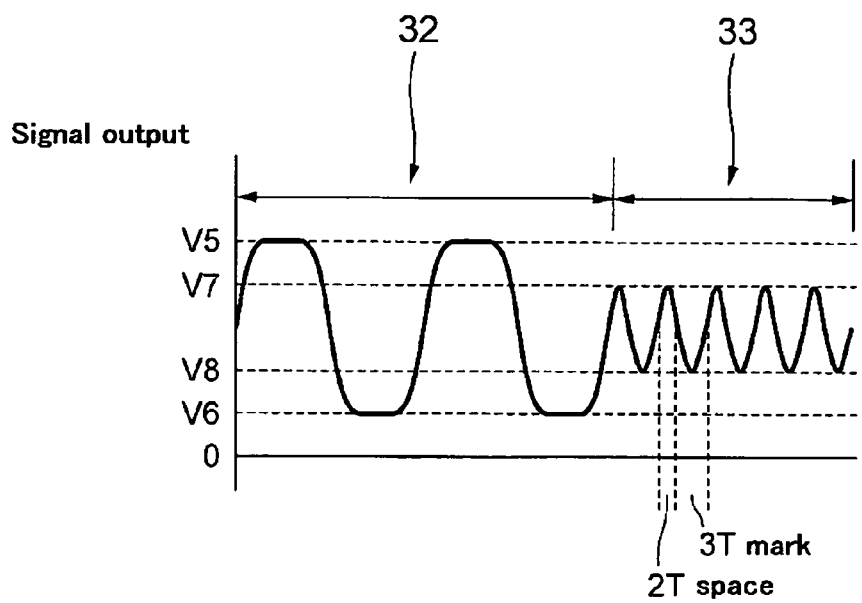
FIG. 5 is a waveform diagram showing an example of an asymmetry measuring recording pattern adopted in an optical disk drive based on a second embodiment of the present invention.

FIG. 5 shows another example of an asymmetry measuring recording pattern used in an optical disk drive according to the second embodiment of the present invention. The present embodiment differs from the first embodiment in that the recording pattern shown in FIG. 5 is used in place of the recording pattern shown in FIG. 1 when selecting a recording power. The optical disk drive according to the present embodiment has a similar structure to the optical disk drive 10 shown in FIG. 4. The present inventor has found that accuracy in detection of a recording power can be remarkably improved by modifying the asymmetry measuring recording pattern to be recorded on a predetermined area of an optical disk to select a recording power.

The recording pattern shown in FIG. 5 (hereinafter referred to as a special recording pattern) is a modification to the recording pattern shown in FIG. 1. The normal recording pattern shown in FIG. 1 consists of exclusive 11T signals 30 which include long marks and spaces each having a length of 11T, and exclusive 3T signals which include short marks and spaces each having a length of 3T. The special recording pattern used in the present embodiment uses an anomalistic signal having a 3T mark length which is the shortest among modulated codes and a space length even shorter than the 3T space length which is the shortest as well, in place of the single signal 31 which include short marks and spaces each being 3T long.

In the example shown in FIG. 5, the anomalistic signal 33 is comprised of the shortest marks 3T among EFMplus-modulated codes, as a mark length, and of spaces 2T each being shorter than the shortest space 3T. The 2T space is even shorter than the 3T space which is the shortest among EFMplus-modulated signals, and therefore does not originally exist in EFMplus-modulated codes.

In the present embodiment, the special pattern shown in FIG. 5 which is recorded on a predetermined area of an optical disk is read. Displacements or in other words asymmetry values of an averaged signal level of the exclusive 11T signals 32 and the anomalistic signal 33 consisting of 3T marks and 2T spaces are calculated to determine a recording power. The asymmetry value A is defined by the following expression where V5 is the maximum amplitude of the exclusive 11T signals, V6 is the minimum amplitude of the exclusive 11T signals, V7 is the maximum amplitude of the anomalistic signal, and V8 is the minimum amplitude of the anomalistic signal.

$$A = \frac{(V5 + V6) - (V7 + V8)}{2 \cdot (V5 - V6)}$$

Figure 6:
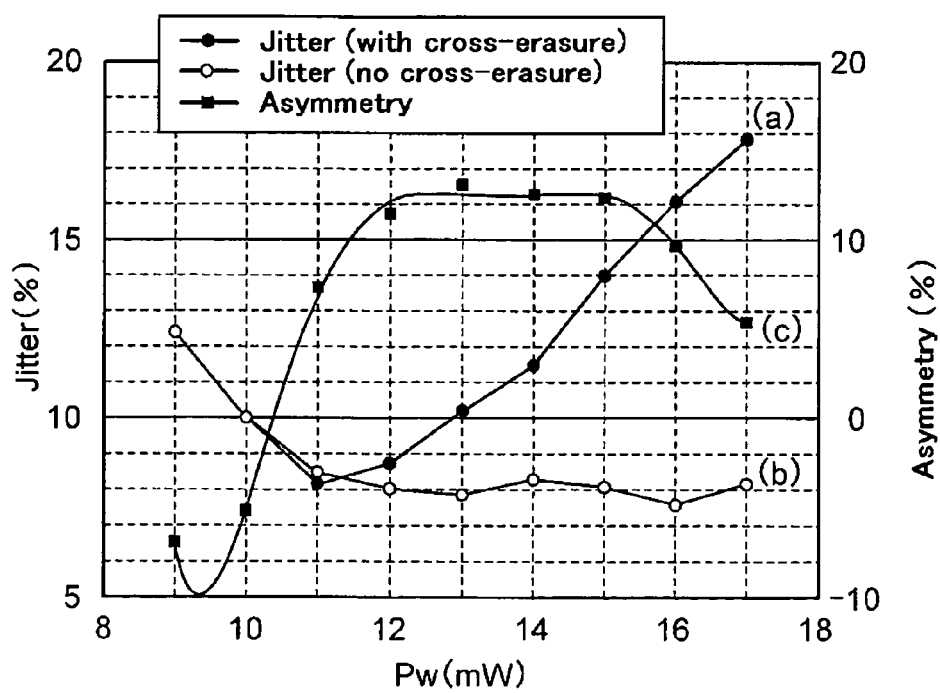
FIG. 6 is a graph showing characteristics of a reproduced signal from a recording medium which has recorded the special recording pattern shown in FIG. 5.

FIG. 6 shows, as experimental results, characteristics of reproduced signals from a recording medium which recorded the special recording pattern shown in FIG. 5. In this experiment, the recording pattern shown in FIG. 5 was recorded on a recording track of a recording medium (DVD-RW) and was then reproduced therefrom. Recoding was carried out supposing two cases. In one case (curve (a)), recording was performed both on a recording track and on tracks adjacent to the recording track. In another case (curve (b)), recording was performed only on a recording track and not on adjacent tracks. Recorded signals were reproduced in both cases, and jitters of the reproduced signals were measured. Further, from the reproduced signal in case of the recording under conditions of the curve (b), asymmetry values (curve (c)) were calculated.

Referring to FIG. 6, as the laser power increases from 9 mW, recording quality improves and jitters of reproduced signals decrease (curves (a) and (b)), like the characteristics shown in FIG. 2. However, after the laser power exceeds 11 mW, cross-erase occurs on the curve (a) and the jitter of the reproduced signal increases, thereby degrading the recording quality. On the other side, no cross-erase occurs on the curve (b), and therefore, the jitter of the reproduced signal does not significantly change.

In the example of FIG. 6, as the laser power increases, and upon reaching a certain laser power (12 mW), the asymmetry value becomes substantially constant. A greater (or longer) 3T mark provides a grater asymmetry value. The result that the asymmetry value remains unchanged from the boundary of the particular laser power means that the 3T mark does not become greater any more if the laser power is increased beyond the boundary.

If the laser power is increased more beyond the boundary, the 3T mark cannot be enlarged any more on the following ground. That is, a one-cycle-previously formed 3T mark is slightly erased by another 3T mark formed next. In other words, it is possible to state that cross-erase occurs in a tangential direction (recording track direction). Thus, two kinds of cross-erase occur in the optical disk, i.e., cross-erase occurring between adjacent tracks in the radial direction (which is the direction vertical to the recording track) and cross-erase occurring in the tangential direction on one single track.

The present inventor has found that cross-erase in the tangential direction and cross-erase in the radial direction are correlated to each other, and cross-erase in the radial direction can be estimated by estimating cross-erase in the tangential direction. Also, the present inventor has found that the occurrence rate of cross-erase in the tangential direction can be changed by adjusting the space between 3T marks in the anomalistic signal shown in FIG 6. Thereafter, the inventor has concluded through devotional studies and discussions that when the space between 3T marks is about 2T, cross-erase in the radial direction can be estimated excellently from cross-erase in the tangential direction.

As shown in FIG. 6, a laser power (curve (c)) at which the asymmetry value stops changing even when the laser power is further increased overlaps substantially another laser power (curve (a)) at which the jitter of the reproduced signal is minimized under conditions that cause cross-erase. Therefore, it is possible to perform excellent recording on an optical disk by using as the recording power the former laser power beyond which the asymmetry value remains unchanged even when the laser power is further increased.

Figure 7:
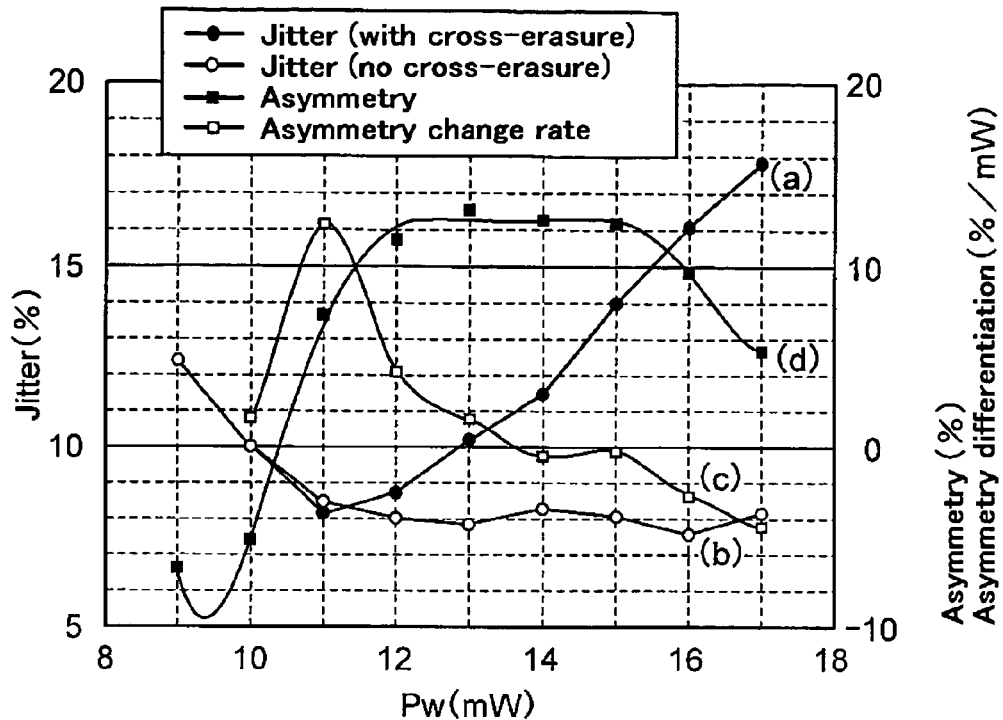
FIG. 7 is a graph showing a change rate of an asymmetry value overlapped over the characteristics shown in FIG. 6.

FIG. 7 shows change rates of asymmetry values overlapped over the characteristic curves shown in FIG. 6. The above-described laser power beyond which the asymmetry value remains unchanged even when the laser power is further increased can be easily detected by obtaining change rates of asymmetry values relative to laser powers. It can be understood from FIG. 6 that the jitter of the reproduced signal is minimized at the laser power at which the change rate of the asymmetry value is maximized. Comparing the curves (c) between FIGS. 2 and 7, the change rate of the curve (c) in FIG. 7 has a much clearer peak than that in FIG. 2. Therefore, accuracy in detection of the recording power which minimizes the jitter of the reproduced signal improves compared with the first embodiment.

In the present embodiment, it is possible to select a recording power with which excellent recording can be achieved even under conditions that cause cross-talk in the radial direction, by searching for the maximum value among change rates of asymmetry values, like the first embodiment. In addition, the recording pattern for measuring asymmetry values, to be recorded on a predetermined area of an optical disk, is modified into a special pattern as shown in FIG. 5. Therefore, the peak of the maximum value among the change rates of asymmetry values becomes clearer than in the first embodiment. As a result, the accuracy in detection of a proper recording power improves.

Figure 8:
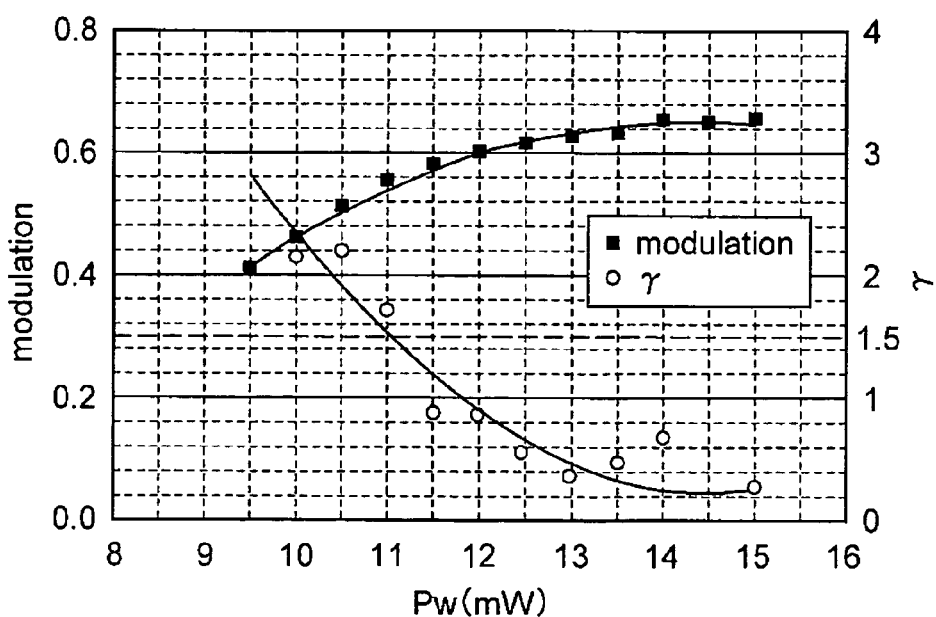
FIG. 8 is a graph showing characteristics of a signal amplitude (modulation) of a reproduced signal in relation to a laser power used in the γ method.

FIG. 8 shows characteristics as to the signal amplitude (modulation) of reproduced signals in relation to the laser power. For references, the recording power is selected by using the γ method like in conventional techniques when recording is performed on a DVD-RW which has the characteristics shown in FIGS. 6 and 7. In case of using the γ method, a laser power (11 mW) with which the standardized γ value becomes 1.5 is multiplied by 1.22 to obtain a recording power of 13.4 mW, as shown in FIG. 8.

In FIGS. 6 and 7, a consideration is taken into the jitters of reproduced signals at the laser power of 13.4 mW. Under conditions (curve (b)) that cause no cross-erase in the radial direction, the jitter of the reproduced signal is close to an optimum point. However, under conditions (curve (a)) that cause cross-erase in the radial direction, the jitter is great and far from the optimum point. That is, according to the conventional method, excellent recording quality cannot be ensured under conditions that cause cross-erase. It is hence understood that the γ method adopted in DVD-RWs is not capable of selecting a recording power which reduces jitters.

EXAMPLE 2

An optical disk drive 10 having a similar structure to that shown in FIG. 4 was manufactured as a test product. A recording power was selected with use of the special recording pattern as described above, and recording was carried out on a DVD-RW. In the optical disk drive 10 as a test product, the special recording pattern shown in FIG. 5 was batch-recorded on a PCA (Power Calibration Area) provided for laser power adjustment in the DVD-RW, while changing the laser power for every one sync-frame. Next, the special recording patterns recorded on the PCA were batch-reproduced, and asymmetry values relative to respective laser powers were calculated.

From the relationship between the calculated asymmetry values and the laser power, change rates of the asymmetry values were obtained, and the laser power which maximizes the change rate is searched for. The laser power was selected as a recording power. The laser power thus selected was 11 mW. As a comparative example, recording was performed also on adjacent tracks, and actual optimum recording power was conformed. The recording power thus checked was 11 mW. In this manner, the recording power obtained in the method according to the above embodiment was proved to be equal to the actual optimum recording power. It was thus proved that the recording power is selected with higher accuracy than in the first embodiment.

The time length required for selecting the recording power from the recording on the PCA area was equivalent to about two turns of the disk (several miliiseconds). It was hence confirmed that this selection of the recording power was achieved at a higher speed, compared with other selection of the recording power by performing sequential recording on tracks. With the recording power thus selected, writing was carried out sequentially on a plurality of tracks on the DVD-RW, i.e., writing was carried out under conditions that cause cross-erase. Signals recorded on the DVD-RW were reproduced, and the jitters of the reproduced signals were measured. The measured jitters were about 8% which is an excellent value. It was been thus proved that more excellent recording was achieved than in the first embodiment.

Figures 9, 10, 11:
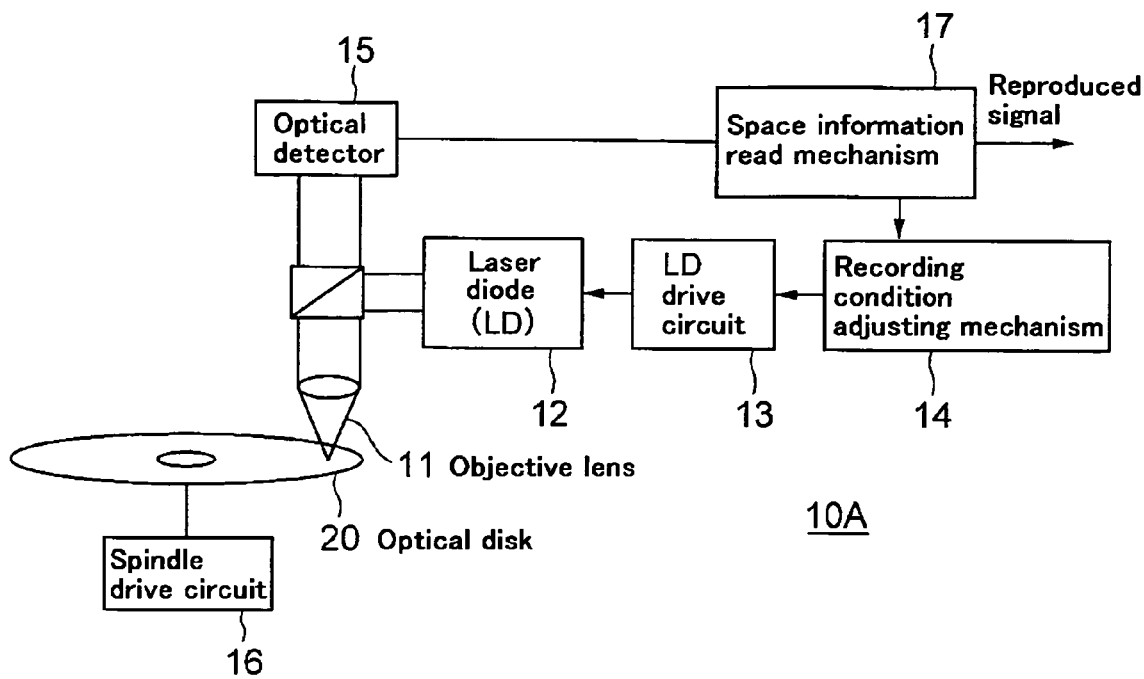
FIG. 9 is a block diagram showing an optical disk drive used in a third embodiment of the present invention.
FIG. 10 is a table showing correspondence between coded space information and a space between 3T marks.
FIG. 11 is a table showing correspondence between compatibility information codes and applicability to be recorded on an optical disk.

FIG. 9 shows a structure of an optical disk drive according to the third embodiment of the present invention. The present embodiment differs from the second embodiment in that the space having a shorter cycle than the shortest space (3T) of the anomalistic signal of the special recording pattern shown in FIG. 5 can be set for every optical disk 20. The optical disk drive 10A has a space information read mechanism 17 in addition to the structure shown in FIG. 4.

Depending on track pitches of optical disks 20 to be recorded or characteristics of media, the recording power may be selected with higher accuracy if the space between 3T marks in the anomalistic signal of the special recording pattern shown in FIG. 5 is configured by a space different from the 2T space. To be able to set the space between 3T marks in the anomalistic signal individually for every medium, the length of a space to be formed between 3T marks may be recorded in advance as space information on a predetermined area of the optical disk 20. The space information read mechanism 17 reads the space information from the optical disk 20 prior to recoding of a special recording pattern, and determines a special recording pattern to be used for selecting a recording power.

FIG. 10 is a table showing the correspondence between coded space information and the space between 3T marks. The space information is coded, for example, into 4-bit data, and recorded on an optical disk 20, as disk information in which information specific to the disk is written. The space information read mechanism 17 decodes the coded space information and determines the space length between 3T marks. In the example shown in FIG. 10, space lengths from 1T to 2.8T can be set respectively in correspondence with codes 0001b to 1010b.

In the present embodiment, the space information is recorded on the optical disk 20. The optical disk drive 10A reads space information from the optical disk 20 prior to selection of a recording power, and determines a special recording pattern. By setting space information corresponding to the track pitches or characteristics of individual optical disks 20, the special recording pattern can be changed individually for every optical disk 20. Accordingly, the recording power can be selected with use of a special recording pattern suitable for the optical disk 20 as a recording target.

EXAMPLE 3

The optical disk drive 10A shown in FIG. 10 was manufactured as a test product. With respect to a DVD-RW on which space information had been recorded, a recording power was selected in accordance with the procedure as described above and recording is performed on the DVD-RW. Since an optical disk having characteristics similar to those of the second embodiment was used as the DVD-RW, the anomalistic signal of the special recording pattern may be constituted by 3T marks and 2T spaces. Therefore, a 4-bit space information code 0110b was embedded in a reserved area of a LPP (Land Pre-Pit) on the DVD-RW.

The optical disk drive 10A read space information from the DVD-RW described above and determined a special recording pattern to be recorded on a PCA area when selecting a recording power in accordance with the space information. The optical disk drive 10A manufactured as a test product selected a recording power with use of the determined special recording pattern, and performed sequential recording on the DVD-RW described above with the selected special recording power. When a recorded signal was reproduced from the DVD-RW, jitters were found to be as excellent as about 8%, like in the optical disk drive 10 manufactured as a test product according to the second embodiment.

With respect to existing optical disks, excellent reproduction of recorded signals can be achieved by selecting as a recording power the laser power which maximizes the change rate of the asymmetry value is selected. However, there can be a future development of a new recording medium for which a recording power is selected according to the method adopted in the embodiment as described above. In that case, reproduction of recorded signals from such a new recording medium can rather be more excellent by selecting a recording power according to a different method. To respond to this case, whether or not the method is applicable to the optical disk may be recorded in advance as compatibility information. Further, the optical disk drive may be constructed to be capable of switching methods to be used for selecting a recording power in accordance with the compatibility information read from the disk.

FIG. 11 is a table recorded on an optical disk and showing the correspondence between coded compatibility information and applicability. The optical disk drive which reads the compatibility information from an optical disk has a compatibility information read mechanism in place of or in addition to the space information read mechanism 17 shown in FIG. 11. The compatibility information is coded into a 4-bit code and recorded in advance on an optical disk, as disk information in which information specific to the disk is written. The optical disk drive reads the compatibility information code and determines whether or not the method described in the above embodiment should be applied to selection of a recording power.

For example, the compatibility information is recorded on an unoccupied area (reserved) of a LPP (Land Pre-Pit) in a DVD-RW. According to this structure, the method to be used for selecting a recording power can be switched in correspondence with the optical disk as a recording target. Therefore, manufactures of optical disk drives can introduce the above method into optical disk drives, without caring future changes in characteristics of media. This is a great merit for both the media manufactures and drive manufactures.

The embodiments have been described above mainly exemplifying a DVD-RW as a phase-change optical disk. The present invention is applicable also to other various recording media. For example, recorded signals can be reproduced excellently if a DVD+RW or a DVD-RAM is adopted as an optical disk. In addition, the optical disk drive may be constructed as an optical disk drive which records/reproduces data onto/from existing CDs and/or DVDs. Alternatively, the optical disk drive may be constructed as an optical disk drive which performs recording on other recording media. For example, the optical head of the optical disk drive may have a laser wavelength of 405 nm (blue) and a numerical aperture NA of 0.85.

Also, in the above embodiments, exclusive 11T signals is used as a part of an asymmetry measuring recording pattern (special recording pattern). However, this part may be constituted by a different signal from the exclusive 11T signals. The part of the exclusive 11T signals shown in FIG. 1 or 5 is constituted as a reference signal, and is used as a reference level to monitor the level of a successive exclusive 3T signals or a signal consisting of 3T marks and 2T spaces. Since the reference signal needs only to have a relatively long cycle, the part constituted as exclusive 11T signals may be replaced with a 14T single signal or 10T single signal.

In the above, the present invention has been described on the basis of preferred embodiments thereof. However, the method for selecting a laser power, information recording medium, and information recording device according to the present invention are not limited to the above embodiments. A variety of corrections and modifications to the laser power selecting method, information recording medium, and information recording device may be derived from the structures of the above embodiments. Those corrections and modifications should be included in the scope of the present invention. For example, modulated codes of a different type such as 1–7 modulation may be adopted in addition to the EFMplus-modulated codes.

As has been described above, in the laser power selecting method, information recording medium, and information recording device according to the first aspect of the present invention, change rates of asymmetry values relative to laser powers are obtained, and a recording power is selected based on the change rates. Therefore, the recording power can be selected based on asymmetry values even for an information recording medium of a phase-change type to which the β method has not been conventionally applicable. In another laser power selecting method according to the second aspect of the present invention, a signal pattern to be recorded on an information recording medium when selecting a recording power is let include a shorter space than the shortest space among modulated codes. As a result of this, cross-erase in the radial direction can be estimated. It is therefore possible to select a recording power capable of reproducing excellently a recording signal, without performing recording on adjacent tracks to inspect influences from cross-erase in the radial direction. Hence, the time length required to select a recording power can be shortened compared with conventional techniques.

The invention claimed is:

1. A laser power selecting method for selecting a laser power to record modulated codes on an information recording medium by use of a laser beam, comprising the steps of:
  recording a predetermined signal pattern on the information recording medium;
  reproducing the predetermined signal pattern recorded, and calculating an asymmetry value from the predetermined signal pattern reproduced;
  obtaining a change rate of the asymmetry value relative to a laser power; and
  selecting a laser power at which the change rate assumes a maximum value,
  wherein the predetermined signal pattern is a combination pattern which combines sequentially a first signal having at least one mark and at least one space which are respectively longer in length than the shortest mark and shortest space among modulated codes to be recorded, and a second signal having a plurality of marks equal in length to the shortest mark among the modulated codes to be recorded and a plurality of spaces shorter in length than the shortest space among the modulated codes to be recorded.

2. An information recording medium on which information is recorded by use of the method according to claim 1, wherein information as to whether or not the laser power selecting method is applicable is recorded on the information recording medium.

3. A laser power selecting method for selecting a laser power to record modulated codes on an information recording medium by use of a laser beam, the method comprising:
recording a predetermined signal pattern on an information recording medium;
reproducing the predetermined signal pattern recorded; and
selecting a laser power on the basis of the predetermined signal pattern reproduced, wherein:
the predetermined signal pattern is a combination pattern which combines sequentially a first signal having at least one mark and at least one space which are respectively longer in length than the shortest mark and shortest space among modulated codes to be recorded, and a second signal having a plurality of marks equal in length to the shortest mark among the modulated codes to be recorded and a plurality of spaces shorter in length than the shortest space among the modulated codes to be recorded.

4. The laser power selecting method according to claim 3, wherein each of mark length and space length of the modulated codes to be recorded is expressed by nT where n is 3, 4, 5, 6, 7, 8, 9, 10, 11, or 14 and T is a channel clock cycle.

5. The laser power selecting method according to claim 4, wherein the first signal has mark and space lengths of 10T, 11T, or 14T.

6. The laser power selecting method according to claim 4, wherein the second signal has a mark length of 3T and a space length of 2T.

7. The laser power selecting method according to claim 3, wherein in the step of selecting the laser power, an asymmetry value is calculated from the predetermined signal pattern reproduced, and a laser power is selected on the basis of the asymmetry value.

8. The laser power selecting method according to claim 7, wherein in the step of selecting the laser power, a change rate of the asymmetry value relative to a laser power is obtained from the asymmetry value, and a laser power at which the change rate assumes a maximum value is selected.

9. An information recording medium on which information is recorded by use of the method according to claim 3, wherein information as to said space shorter than the shortest space length is recorded on the information recording medium.

10. The information recording medium according to claim 9, wherein information as to whether or not the laser power selecting method is applicable is recorded on the information recording medium.

11. An information recording device which records modulated codes on the information recording medium according to claim 9, further comprising information reproducing means for reading information as to a space length shorter than the shortest space length and a laser power adjusting means for selecting a laser power on the basis of the information read.

12. The information recording device according to claim 11, wherein when modulated codes are recorded on the information recording medium, and wherein information as to whether or not the laser power selecting method is applicable is recorded on the information recording medium, the information reproducing means reads information as to whether or not the laser power selecting method is applicable, and the laser power adjusting means determines whether one of a plurality of laser power selecting methods should be adopted on the basis of the information read.

13. The information recording device according to claim 11, further comprising a memory device which stores therein the information as to the space length shorter than the shortest space length.

14. An information recording device which records modulated codes on an information recording medium by use of a laser beam, comprising:
recording means for recording a combination signal pattern on an information recording medium, the signal pattern combines sequentially a first signal having at least one mark and at least one space which are respectively longer in length than shortest mark and shortest space among modulated codes to be recorded, and a second signal having a plurality of marks equal in length to the shortest mark among the modulated codes to be recorded and a plurality of spaces shorter than the shortest space among the modulated codes to be recorded;
reproducing means for reproducing the combination signal pattern recorded by the recording means; and
laser power adjusting means for selecting a laser power on the basis of the combination signal pattern reproduced by the reproducing means.

15. The information recording device according to claim 14, wherein each of mark length and space length of the modulated codes to be recorded is expressed by nT where n is 3, 4, 5, 6, 7, 8, 9, 10, 11, or 14 and T is a channel clock cycle.

16. The information recording device according to claim 15, wherein the first signal has mark and space lengths of 10T, 11T, or 14T.

17. The information recording device according to claim 15, wherein the second signal has a mark length of 3T and a space length of 2T.

18. The information recording device according to claim 14, wherein the laser power adjusting means calculates an asymmetry value from the reproduced signal, and selects a laser power on the basis of the asymmetry value.

19. The information recording device according to claim 18, wherein the laser power adjusting means obtains a change rate of the asymmetry value relative to a laser power from the calculated asymmetry value, to select a laser power at which the change rate assumes a maximum value.

* * * * *